United States Patent
Cloft

(10) Patent No.: US 8,950,702 B2
(45) Date of Patent: Feb. 10, 2015

(54) PYLON AND ENGINE MOUNT CONFIGURATION

(75) Inventor: Thomas G. Cloft, Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 2124 days.

(21) Appl. No.: 12/016,234

(22) Filed: Jan. 18, 2008

(65) Prior Publication Data

US 2009/0184197 A1 Jul. 23, 2009

(51) Int. Cl.
*B64D 27/26* (2006.01)

(52) U.S. Cl.
CPC .......... *B64D 27/26* (2013.01); *B64D 2027/268* (2013.01); *B64D 2027/266* (2013.01); *Y02T 50/44* (2013.01)
USPC ................................ 244/54; 248/554; 60/796

(58) Field of Classification Search
USPC .......... 244/54–55; 248/554–557; 60/796–797
See application file for complete search history.

(56) References Cited

U.S. PATENT DOCUMENTS

| | | | |
|---|---|---|---|
| 4,013,246 A * | 3/1977 | Nightingale | 244/54 |
| 4,065,077 A | 12/1977 | Brooks | |
| 4,428,189 A | 1/1984 | Greenberg | |
| 4,934,140 A | 6/1990 | Dennison | |
| 5,443,230 A | 8/1995 | Lord | |
| 5,474,258 A | 12/1995 | Taylor | |
| 5,746,391 A | 5/1998 | Rodgers | |
| 5,775,638 A | 7/1998 | Duesler | |
| 6,126,110 A * | 10/2000 | Seaquist et al. | 244/54 |
| 6,296,203 B1 * | 10/2001 | Manteiga et al. | 244/54 |
| 6,474,597 B1 | 11/2002 | Cazenave | |
| 6,601,796 B2 * | 8/2003 | Roszak | 244/54 |
| 6,708,925 B2 | 3/2004 | Udall | |
| 6,935,591 B2 | 8/2005 | Udall | |
| 6,988,692 B2 | 1/2006 | Pasquer et al. | |
| 7,104,306 B2 * | 9/2006 | Huggins et al. | 164/47 |
| 2004/0251381 A1 * | 12/2004 | Pasquer et al. | 244/54 |
| 2005/0194493 A1 * | 9/2005 | Marche | 244/54 |
| 2005/0269445 A1 | 12/2005 | Chevalier et al. | |
| 2006/0231679 A1 | 10/2006 | Chamberlain | |

FOREIGN PATENT DOCUMENTS

| | | |
|---|---|---|
| EP | 564126 A1 | 10/1993 |
| GB | 2375513 A | 11/2002 |

OTHER PUBLICATIONS

Search Report from corresponding EP Application 08253736.6, Oct. 22, 2012.

* cited by examiner

*Primary Examiner* — Joseph W Sanderson
(74) *Attorney, Agent, or Firm* — Carlson, Gaskey & Olds, PC

(57) ABSTRACT

A mounting arrangement for a gas turbine engine includes a pylon mount structure that has a fore mount portion and an aft mount portion. A first engine mount beam is integrally formed with the fore mount portion as a single-piece component, and a second engine mount beam is integrally formed with the aft mount portion as a single-piece component. The first engine mount beam is attachable to the engine case at a fore attachment interface, and the second engine mount beam is attached to the engine case at an aft attachment interface.

14 Claims, 3 Drawing Sheets

PYLON AND ENGINE MOUNT CONFIGURATION

BACKGROUND OF THE INVENTION

This disclosure relates to a mounting arrangement for a gas turbine engine and, more particularly, to a mounting arrangement that includes front and rear engine mount beams that are integrally formed with respective pylon mount structures.

Pylons are used to attach gas turbine engines to an aircraft wing. Pylon mounting structures connect an engine case of the gas turbine engine to the pylon. In one known arrangement, a pylon pyramid includes a first or fore pylon mounting flange that is secured to a mating flange on a front engine mount beam at a first bolted joint. The front engine mount beam is then attached to the engine case via another bolted joint to provide a fore or front engine mount. An aft pylon flange includes a second pylon mounting flange that is secured to a mating flange on a rear engine mount beam at a second bolted joint. The rear engine mount beam is then attached to the engine case to provide a rear or aft engine mount.

The use of multiple bolted joints is disadvantageous from weight, material cost, and labor cost perspectives. Accordingly, there is a need for a mounting arrangement that provides for an easier and more cost effective assembly of a gas turbine engine to a pylon.

SUMMARY OF THE INVENTION

An example mounting arrangement for a gas turbine engine includes a pylon mount structure that has a fore mount portion and an aft mount portion. A first engine mount beam is integrally formed with the fore mount portion as a single-piece component, and a second engine mount beam is integrally formed with the aft mount portion as a single-piece component. The first engine mount beam is attachable to the engine case at a fore attachment interface, and the second engine mount beam is attached to the engine case at an aft attachment interface.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
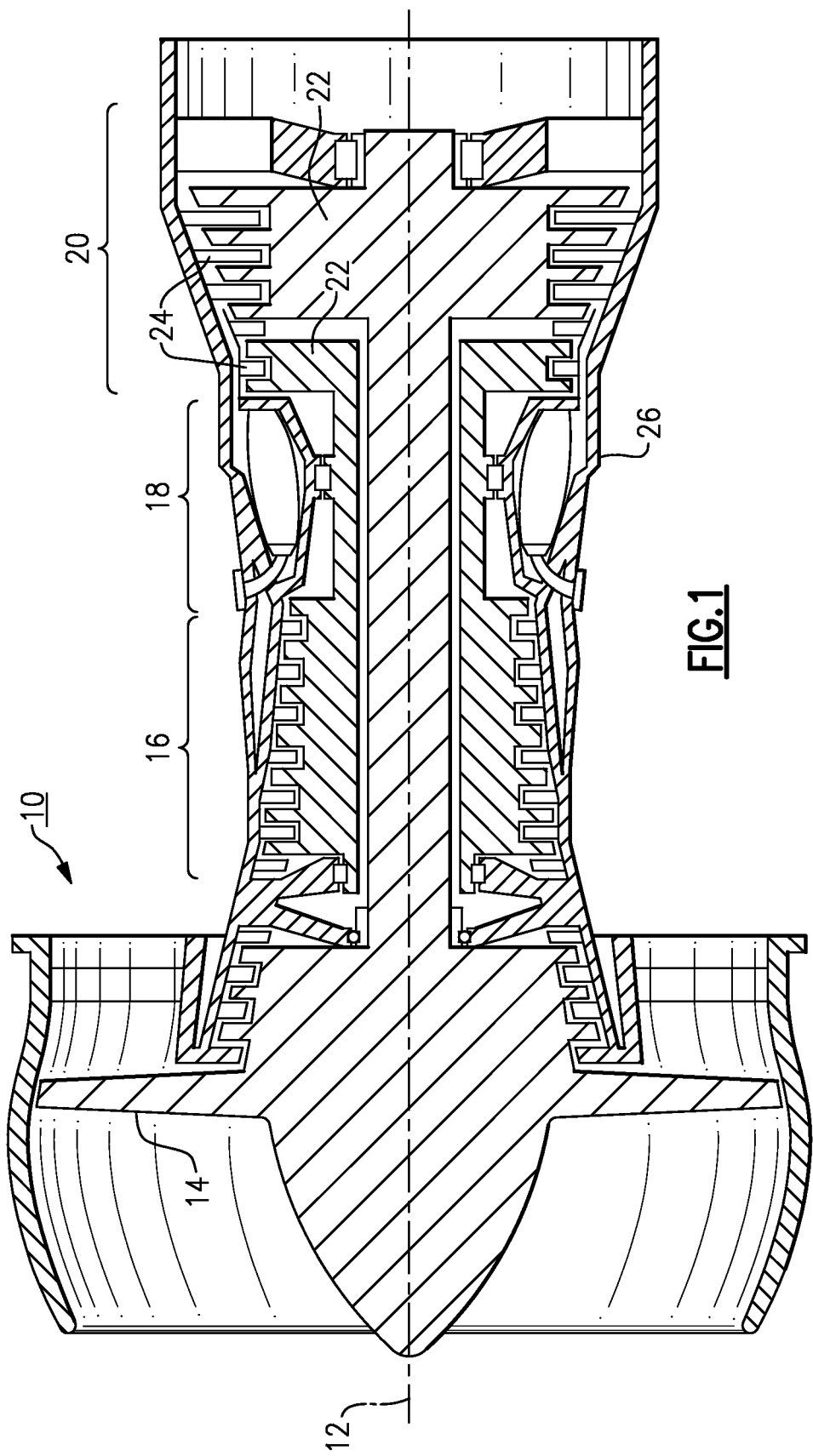
FIG. 1 is a highly schematic view of an example of a gas turbine engine.

FIG. 1 illustrates selected portions of an example turbine engine 10, such as a gas turbine engine 10 used for propulsion. In this example, the turbine engine 10 is circumferentially disposed about an engine centerline 12. The turbine engine 10 includes a fan 14, a compressor section 16, a combustion section 18, and a turbine section 20. The compressor section 16 and the turbine section 20 include corresponding blades 22 and vanes 24. As is known, air compressed in the compressor section 16 is mixed with fuel and burned in the combustion section 18 to produce hot gasses that are expanded in the turbine section 20. An engine case 26 is made up of case sections that are attached to each other to enclose the internal components of the turbine engine.

FIG. 1 is a somewhat schematic presentation for illustrative purposes only and is not a limitation on the disclosed examples. Additionally, there are various types of gas turbine engines, many of which could benefit from the examples disclosed herein and are not limited to the designs shown. For example, a gas turbine engine may contain a gearbox disposed between the turbine section 20 and the fan 14, allowing the fan 14 to turn at a different speed than the turbine.

Figure 2:
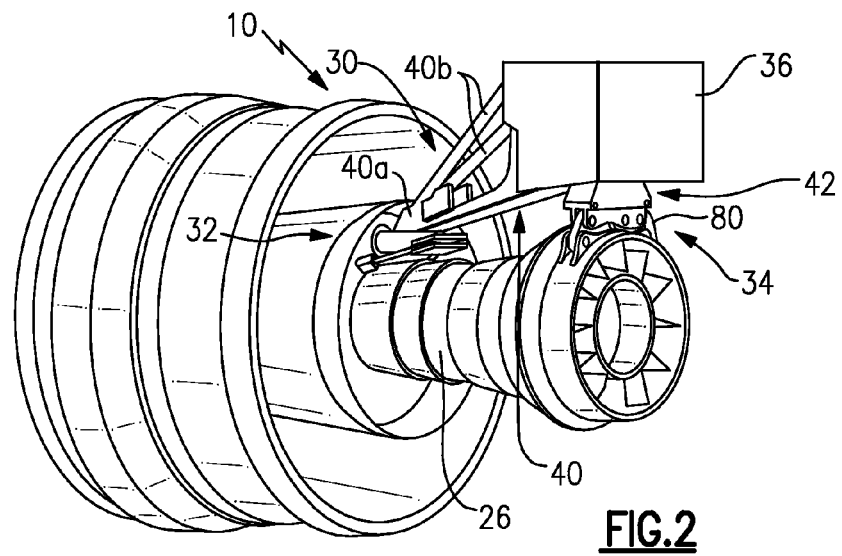
FIG. 2 shows a perspective view of a gas turbine engine and a pylon assembly.

FIG. 2 illustrates a perspective view of the turbine engine 10 with a mounting arrangement 30. The mounting arrangement 30 includes a front mount 32 and a rear mount 34 that are used to mount the turbine engine 10 to a pylon 36, indicated schematically in FIG. 2. The pylon 36 is supported by a wing of an aircraft (not shown) as known. The front 32 and rear mounts 34 are used to attach the engine case 26 to the pylon 36.

The mounting arrangement 30 includes a pylon mount structure that comprises a fore portion 40 and an aft portion 42. In this example, the fore portion 40 comprises a pyramid structure that has a convergent portion 40a and a divergent portion 40b; however, other structural configurations could also be used. In the example shown, the divergent portion 40b comprises a plurality of discrete legs that extend from the convergent portion 40a toward the pylon 36. The aft portion 42 comprises a pylon mounting flange body 44 that extends downwardly from the pylon 36 toward the engine case 26. The mounting flange body 44 is positioned generally aft of the divergent portion 40b of the fore portion 40 of the pylon mount structure. In the example shown, the fore portion 40 and aft portions 42 are separate components.

Figure 3:
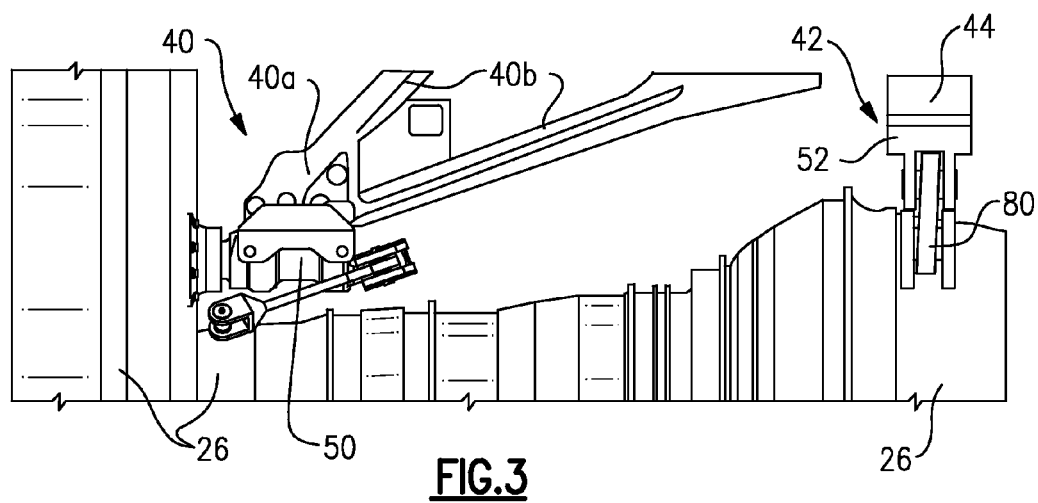
FIG. 3 shows a side view of front and rear mount assemblies that connect an engine case to the pylon assembly.

As shown in FIG. 3, a fore engine mount beam 50 is integrally formed with the fore portion 40 of the pylon mount structure. Thus, the fore portion 40 and the fore engine mount beam 50 comprise a single-piece component, i.e. are a unitary component with a continuous and uninterrupted surface. An aft engine mount beam 52 is integrally formed with the aft portion 42 of the pylon mount structure. Thus, the aft portion 42 and the aft engine mount beam 52 also comprise a single piece component, i.e. are a unitary component with a continuous and uninterrupted surface.

The fore engine mount beam 50 is unitarily formed with the convergent portion 40a of the pyramid structure. The fore engine mount beam 50 is then mounted to the engine case 26 to provide the front mount 32. The aft engine mount beam 52 is mounted to the engine case 26 at a rearward position to provide the rear mount 34. This configuration eliminates at least two bolted joint interfaces, which is advantageous from a cost and labor perspective.

Figure 4:
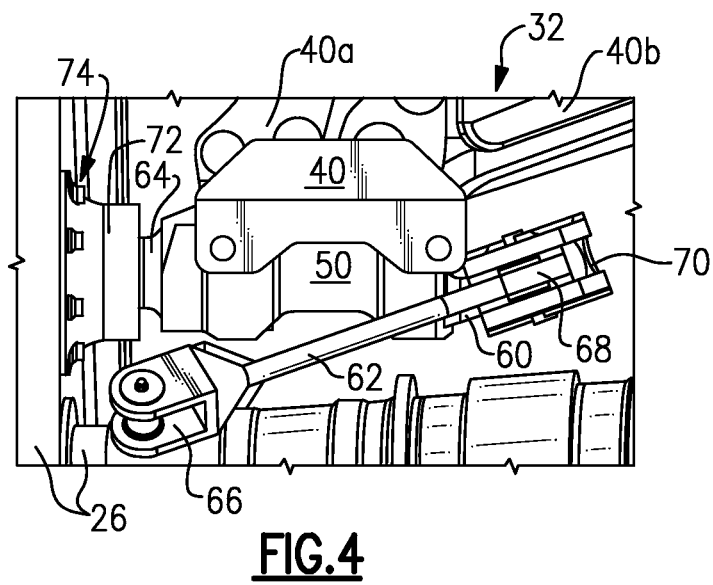
FIG. 4 is a magnified view of the front mount assembly of FIG. 2.

FIG. 4 shows the front mount 32 in greater detail. The fore engine mount beam 50 includes a first attachment structure portion 60, comprising at least one mounting boss for example, that supports a thrust link 62 and includes a second attachment structure portion 64 that provide an attachment interface to the engine case 26. The thrust link 62 includes a first link end 66 that is pivotally connected to one portion of the engine case 26 and a second link end 68 is connected to the first attachment structure portion 60 via a "whiffle" tree connector 70. The second attachment structure portion 64 is associated with an engine mounting flange 72 and is attached to another portion of the engine case 26 at a bolted joint interface 74.

Figure 5:
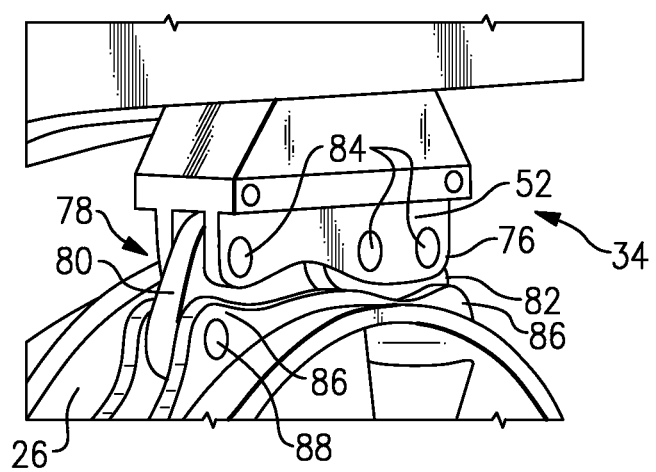
FIG. 5 is a magnified view of the rear mount assembly of FIG. 2.

FIG. 5 shows the rear mount 34 in greater detail. The aft engine mount beam 52 includes attachment structure 76 that is used to pivotally connect the aft engine mount beam 52 to another portion of the engine case 26 via a linkage assembly 78. The linkage assembly 78 includes at least one link member, and in the example shown, the linkage assembly 78 includes a first link 80 and a second link 82. The attachment structure 76 comprises a plurality of mounting lug portions that support pivot pins 84 for the linkage assembly. The links 80, 82 each have at least one pivotal connection to the aft engine mount beam 52 and at least one pivotal connection to the engine case 26. The engine case 26 includes lugs 86 that are formed to receive pivot pins 88.

By integrally forming the fore 50 and aft 52 engine mount beams with the respective pylon mounting structures, significant weight and cost savings are provided. Also, time consuming assembly of multiple bolted joints is avoided, which improves labor and maintenance costs.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A mounting arrangement for a gas turbine engine comprising:
a pylon mount structure having a first mount portion and a second mount portion positioned aft of said first mount portion, said first and said second mount portions comprising separate components to be independently attached to a pylon;
a first engine mount beam integrally formed with said first mount portion as a single-piece component, said first engine mount beam being attachable to an engine case structure at a fore attachment interface, and wherein said first engine mount beam includes attachment structure to support at least one thrust link; and
a second engine mount beam integrally formed with said second mount portion as a single-piece component, said second engine mount beam being attachable to the engine case structure at an aft attachment interface, and wherein said second engine mount beam includes attachment structure to pivotally support a linkage assembly.

2. The mounting arrangement according to claim 1 wherein said first engine mount beam is directly attachable to a mating fore engine case structure.

3. The mounting arrangement according to claim 1 wherein said second engine mount beam includes an integrally formed attachment structure to be attached to a mating aft engine case structure.

4. The mounting arrangement according to claim 3 wherein said integrally formed attachment structure includes at least one pivot mount to be attached to the mating aft engine case structure.

5. The mounting arrangement according to claim 1 wherein said first mount portion comprises a pyramid structure and said second mount portion comprises a flange body.

6. The mounting arrangement according to claim 5 wherein the pyramid structure comprises a convergent portion formed as one-piece with said first engine mount beam and a divergent portion extending away from said convergent portion toward the pylon.

7. The mounting arrangement according to claim 5 wherein said first and said second engine mount beams are separate from each other, said first engine mount beam being integrally formed as part of said pyramid structure and said second engine mount beam being integrally formed to extend downwardly from said flange body.

8. A mounting arrangement for a gas turbine engine comprising:
an engine case; and
a mounting structure to mount the gas turbine engine to a pylon, said mounting structure including:
a pylon mount structure having a fore mount portion and an aft mount portion wherein the fore and the aft mount portions comprise discrete components to be independently attached to the pylon,
a first engine mount beam integrally formed with said fore mount portion as a first single-piece component, said first engine mount beam including fore attachment structure that is attached to said engine case to form a fore attachment interface, and wherein said fore attachment structure comprises at least one mounting boss that is formed as one-piece with said first engine mount beam,
at least one thrust link having a first link end pivotally connected to said engine case and a second link end that is supported by said at least one mounting boss, and
a second engine mount beam integrally formed with said aft mount portion as a second single-piece component, said second engine mount beam including aft attachment structure that is attached to said engine case to form an aft attachment interface.

9. The mounting arrangement according to claim 8 wherein said engine case includes a first lug that is formed as one-piece with said engine case, and wherein said aft attachment structure comprises a second mounting lug that is formed as one-piece with said second engine mount beam, and including a pivoting link assembly having at least one link member with a first end pivotally connected to said first lug and a second end pivotally connected to said second lug.

10. The mounting arrangement according to claim 9 wherein said at least one link member includes a second link member having one end pivotally connected to a third lug formed as one-piece with said engine case and an opposed end pivotally connected to a fourth lug formed as one-piece with said second engine mount beam.

11. The mounting arrangement according to claim 8 wherein said first single-piece component is directly connected to said engine case and said second single-piece component is pivotally connected to said engine case.

12. The mounting arrangement according to claim 8 wherein said fore mount portion comprises a pyramid structure and said aft mount portion comprises a flange body.

13. The mounting arrangement according to claim 12 wherein said first and said second engine mount beams are separate from each other, said first engine mount beam being integrally formed as part of said pyramid structure and said second engine mount beam being integrally formed to extend downwardly from said flange body.

14. The mounting arrangement according to claim 8 wherein said fore mount portion comprises a pyramid structure having a convergent portion formed as one-piece with said first engine mount beam and a divergent portion extending away from said convergent portion toward the pylon.

\* \* \* \* \*